Patented July 5, 1938

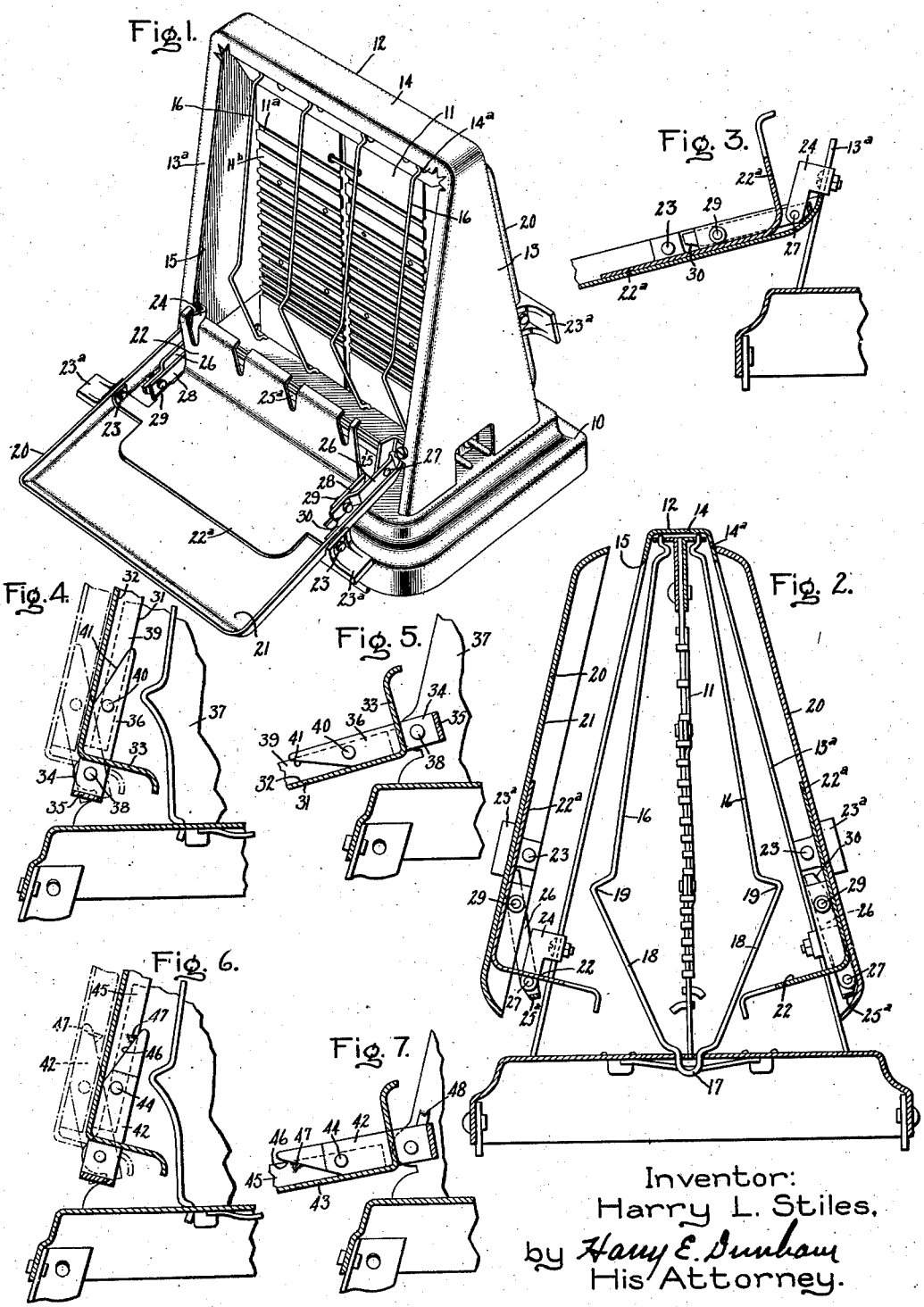

2,123,067

UNITED STATES PATENT OFFICE 2,123,067

TOASTER

Harry L. Stiles, Bridgeport, Conn., assignor to General Electric Company, a corporation of New York Application October 31, 1936, Serial No. 108,605

8 Claims. (Cl. 53—5)

This invention relates to toasters, more particularly to electric toasters, and it has for its object the provision of an improved toaster of this character having slice holders that are adjustable to accommodate the toaster to edibles having various thicknesses, such as slices of bread, sandwiches, rolls and the like.

While not limited thereto, this invention is particularly applicable to electric toasters having a vertically arranged heating element in the center and slice holders on opposite sides arranged to support slices of bread and the like in toasting relation with the heating element, the slice holders being pivotally mounted at their lower ends so that they can be swung away from the heating element for the insertion and removal of the edible.

This invention contemplates the provision of an improved toaster of this character having means supporting the slice holders whereby they can be swung not only away from and toward the heating element, but also can be shifted substantially in a horizontal direction from the heating element to provide toasting spaces varying in depth so as to accommodate bread slices, sandwiches, rolls and the like having various thicknesses.

In accordance with this invention, suitable hinge means are provided including link members connecting the slice holders to the toaster providing for its pivotal movement toward and away from the heating element, and also for its horizontal shifting movement to vary the depth of the toasting space.

For a more complete understanding of this invention, reference should be had to the accompanying drawing in which Fig. 1 is a perspective view of an electric toaster embodying this invention, one of the slice holders being shown in its open position and the other in its closed position; Fig. 2 is a vertical sectional view of the electric toaster shown in Fig. 1; Fig. 3 is a fragmentary sectional view of the electric toaster of Figs. 1 and 2; Fig. 4 is a fragmentary view illustrating a modified form of this invention; Fig. 5 is a view similar to Fig. 4, but showing certain of the parts in different operative positions; Fig. 6 is a fragmentary view illustrating another modified form of this invention; and Fig. 7 is a view similar to Fig. 6, but showing certain of the parts in different operative positions.

Referring more particularly to Figs. 1, 2 and 3, this invention has been shown as applied to a toaster heated by an electric heating element, although it is to be understood that any suitable source of heat may be used. Moreover, it has been shown as applied to an electric toaster comprising a suitable base member 10. Mounted on the base is an upright substantially rectangular heating element 11. As shown in Figs. 1 and 2, the heating element 11 extends longitudinally of the base substantially midway between its sides. Any suitable arrangement of heating element may be used. For example, the unit may consist of a length of resistance heating wire 11a secured on a suitable electrically insulating support 11b including mica insulation.

The heating element is housed in a suitable casing 12, which as shown is provided with upright end members 13 supported on the opposite end portions of the base 10 and a top member 14 joining the two side members 13. The side members have in general a triangular shape, the bases of the triangles resting on the base 10 and their apex being at the top of the toaster where they are joined with the top member 14. This arrangement provides openings 15 at the opposite two sides of the heating element 11. Preferably, the end and top members will be provided with inturned flanges 13a and 14a respectively which form margins for the openings.

Arranged within the casing 12 on opposite sides of the heating element are a plurality of guard members 16 spaced at intervals lengthwise of the toaster, as clearly shown in Fig. 1. The members 16, as shown, are formed of relatively thin rods or wires that are bent to a distorted U-shape. The nexus 17 of each wire is bent in the form of a relatively small U and the two legs of this small U are directed upwardly through apertures provided for them in the base. From the nexus, the leg portions 18 spread outwardly in the form of a V to a point designated by the numeral 19 where they turn inwardly substantially at right angles to the portions 18, and thence upwardly to the upper end of the toaster inclining inwardly toward each as they approach the upper end, as clearly shown in Fig. 2. The upper ends of the guide wires are directed through apertures provided for them in the upper portion of the heating element 11.

Supported on opposite sides of the casing 12 so as to normally close the opening 15 are a pair of slice holders 20. Preferably, the two slice holders 20 will be arranged in the same fashion. As shown, each slice holder 20 comprises a tray 21 adapted to receive a slice of bread, sandwich, roll or similar edible and to form with the guards 16 toasting spaces on opposite sides of the heater element. The holder also has a laterally extending support 22 at its bottom adapted to support the edible in the tray when the tray is in an upright position, as shown in Fig. 2. The support 22, as shown, is formed separately from the tray, and has a plate 22a flush with the inner surface of the tray and secured thereto by means of rivets 23. These rivets also secure suitable handles 23a to the sides of the tray.

The trays when in their normal closed positions rest against the flanges 13a and 14a and close the openings 15. The trays are pivoted at their lower ends to the toaster so that upper ends of the slice holders may be swung away from the heating element. When the trays are so swung, the slices in the trays will be reversed, whereby when the trays are again swung back to their toasting positions with relation to the heating element, the untoasted sides of the slices will be presented to the heating element.

This invention contemplates the provision of improved means for pivotally securing the slice holders 20 to the toaster to provide for the swinging movement of the holders to reverse the slices, and further, to provide for shifting movement of the holders from the heating element to vary the depth of the toasting space between the slice holders and the guards 16.

The connection means between each holder and the toaster comprises suitable hinge brackets 24 secured to the inturned flanges 13a on the end walls 13, as clearly shown in Figs. 1, 2 and 3. Pivotally mounted on these brackets is a suitable hinge member 25. The hinge member 25 has the form of an elongated U. The base 25a of this U-member is positioned below the support 22, but above the lower edge of the tray 21, as clearly shown in Fig. 2. The two arms or links 26 of the U are pivotally connected adjacent the base to the hinge brackets 24 by means of suitable hinge pins 27. From these pins, the arms extend upwardly on opposite sides of the support 22, and at their upper ends are pivotally connected to the tray 21. If desired, the support 22 may be utilized to pivotally interconnect the links 26 with the tray. For this purpose, the plate 22a of the support is provided with ears or upright tab-like members 28 to which the ends of the links 26 are pivotally connected by means of pins 29. The upper ends of the links above the pins are tapered or inclined away from the tray to define edges 30 spaced from the tray, as shown in Figs. 1 to 3.

When a tray or holder 20 is in its normally closed position, as shown in the case of the right-hand holder of Fig. 2, the links 26 occupy the positions shown in this case, that is, the line between the two pivot pins 27 and 29 is substantially parallel with the inner surface of the tray, and the links lie against this inner surface. When the links are in this position, the tray may be swung on the pivot pins 27 from its closed position shown in Fig. 2 to its open position shown in Fig. 1 to receive a slice of bread or the like. If the slice be of normal thickness, the tray may then be closed to bring the slice into the toasting space between the tray and the guard wires 16. When it is desired to reverse the slice, the holder is swung to its open position shown in Fig. 1, which operation reverses the slice, whereupon the holder may be swung back to its toasting position to present the untoasted side of the slice to the heating element.

If it be desired to toast a slice or sandwich or roll that is considerably thicker, the tray can be bodily shifted substantially horizontally away from the heating element so as to increase the depth of the heating space between the tray and the guard wires. This movement of the tray is permitted by the links 26 which rotate on the pivot pins 27 and 29 from their positions relative to the tray and toaster, shown on the right hand side of Fig. 2, toward those shown on the left hand side of this figure. It will be apparent that when the tray is thus shifted, it considerably widens the space between the tray and the guard wires. When the tray and links occupy the adjusted relationship, the tray, as before, may be pivoted away from the heating element to receive or reverse the edible. The upper inclined end portions 30 of the links 26 engage the inner surfaces of the tray, as shown in Fig. 2, to limit the outward shifting movement of the tray. It will be understood, of course, that the tray 20 may be supported in any position between its completely closed and its completely extended positions.

It will be further understood that the ears 28 frictionally engage the hinge arms 23 so as to hold the tray and hinge arms in the fixed relation that is chosen by the attendant.

In Figs. 4 and 5, there is illustrated a modified form of this invention. In this case, the slice holder 31 is provided with a tray 32 for receiving the edible, and a support 33 for the edible at the lower end of the tray formed integrally with the tray, rather than separately as in the first form.

In this case, the hinge means connecting the tray 32 with the toaster comprises a U-shaped member 34 similar to the member 25 of the first form. The base 35 in this case, however, lies below the support 33; and the two legs 36 of the member are pivotally secured directly to the side walls 37 of the toaster by means of pins 38 directed through suitable apertures provided for them in the side walls. Also, the legs 36 in this case are pivotally connected to inturned flanges 39 provided on the sides of the tray 33 by means of pins 40.

In this case, the toaster functions as does the first. Thus, the links 36 may occupy their positions shown in full lines in Figs. 4 and 5 in which case the holders 31 are arranged to accommodate the thin slices, or edibles, whereas when they are moved to their extended positions shown in dotted lines in Fig. 4, the trays will accommodate the thickest edibles.

As before, the arms 36 are provided with inclined surfaces or edges 41 arranged to engage the inner surface of the tray, as shown in dotted lines, in Fig. 4, to limit the shifting or extending movement of the tray.

In Figs. 6 and 7, there is illustrated a third form of this invention which is substantially the same as the second shown in Figs. 4 and 5. In the third form, however, means are provided for positively holding the hinge arms in their respective relative positions with their tray, rather than using the frictional forces between these members, as in the first forms.

As shown in Figs. 6 and 7, the hinge arms 42 are pivoted to the tray or holder 43 by means of pins 44 passed through the arms and side flanges 45 on the tray. The arms 42 also have the inclined surfaces 46 providing for shifting movement of the tray for the purpose of defining the fully extended position of the tray, shown in dotted lines in Fig. 6.

In this case, the side flanges are provided with inwardly extending protuberances 47 in the path of movement of the upper ends of the arms 42, and preferably formed of the material of which the flanges are made.

These protuberances 47 lying in the paths of movement of the arms 42 resist movement of the arms between their positions shown in full lines in Figs. 6 and 7 and in dotted lines in Fig. 6, so that in moving the tray from one of these positions to the other it is necessary for the tapered or inclined ends of the hinge arms to ride or spring over the protuberances. The protuberances thereby function to hold the arms in either of their two positions relative to the tray. It will be understood that the resiliency of the arms 42 and flanges 45, together with the play between these members at the connecting pins 44, permits the arms to move over the protuberances from one position to the other.

Preferably and as shown, the protuberances will have a triangular shape so as to define two holding edges for the two positions of the arms, as clearly shown in Figs. 6 and 7. Stops 48 on the sides of the toaster engage the lower ends of the arms 42, as shown in Fig. 7, so as to limit the downward swinging movement of the tray 43.

The first form of the invention has the advantage that it presents a somewhat neater appearance in that the hinge structure is completely concealed from view, inasmuch as the base member 25a of the hinge member 25 is located behind the lower edge portion of the tray 21 and below the support 22.

While I have shown particular embodiments of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States, is:—

1. A toaster comprising a support, a vertically arranged heating element on said support, a slice holder on one side of said heating element having a tray arranged in a generally vertical position and having an area to receive a slice of bread, and also having a lateral support for the slice at the bottom rigidly joined with the tray so that they cannot be moved relatively to each other, hinge links at the sides of said tray having their lower ends pivoted to said support and their upper ends pivoted to said holder constructed and arranged to support the slice holder in toasting relation with the heating element and providing for swinging movement of the holder on the lower pivoted ends of said links to move the upper end of said holder toward and away from said heating element for the insertion and removal of the slice, and said links pivoting on their lower and upper ends to provide for bodily shifting of said holder in a substantially horizontal direction to and from said heating element to accommodate slices, sandwiches and the like having various thicknesses.

2. An electric toaster comprising a base, an electric heating element on said base supported in a substantially vertical position, a guard on one side of said heating element, a slice holder on said one side arranged to hold a slice between the holder and guard, and hinge means pivotally securing said holder to said base comprising hinge brackets mounted to said base, hinge links having pivotal connections adjacent their ends with said brackets and holder respectively securing said holder to said base and providing for substantially horizontal movement of said holder away from said guard to provide space of varying width between the guard and holder to accommodate slices of bread, sandwiches and the like which vary in thickness, the links having inclined surfaces on their ends that are connected with said holder arranged to engage the holder to limit horizontal movement of said holder away from said guard.

3. A toaster comprising a base, a vertical heating element on said base, a housing for said heating element closed at the ends and top and having relatively large openings in the sides presented to the sides of said heating element, slice holders on opposite sides of said housing each having a tray adapted to receive a slice of bread, sandwich, roll and the like, and a lateral support at its bottom for the edible in said tray, hinge means connecting the lower portions of said holders to said housing supporting them in position to close said openings in the sides and providing for swinging movement of the upper ends of said holders toward and away from said sides for the insertion and removal of the edible, and further, providing for bodily shifting of said trays and supports in a substantially horizontal direction from said opening to accommodate slices, sandwiches and the like which vary in thickness.

4. An electric toaster comprising a base, a vertically arranged heating element on said base, a slice holder on one side of said heating element having a tray for receiving said slice and a support for said slice adjacent the lower end portion of said tray extending laterally from said tray toward said heating element, hinge brackets on opposite sides of said base, an elongated U-shaped hinge member having its base below said support but above the lower edge of said tray and its two arms extending upwardly at the opposite ends of said support, means pivotally connecting said legs to said bracket at points adjacent the base and said bracket, and means pivotally connecting the upper end portions of said legs to the upper sides of said holders at points materially above said holders.

5. A toaster comprising a support, a slice holder on said support arranged generally in a vertical toasting position, hinge means connecting said holder to said support having hinge arms pivotally connected adjacent their lower ends to said support and adjacent their upper ends to said holder, the arms lying against the surface of said holder in said one toasting position, and movable relatively away from said holder to permit the holder to be shifted to a second toasting position, and the upper end portions of said arms being tapered to permit said relative movement and engaging said holder to define said second toasting position.

6. A toaster comprising a support, heating means on said support, a slice holder, hinge means pivotally mounting said slice holder on said support for movement to and from a toasting position with relation to said heating means, said hinge means providing for bodily shifting of said slice holder to each of two toasting positions with relation to said heating means so that slices of widely varying thickness, sandwiches and the like can be supported in proper toasting relation to said heating means and stop means engaging a part of said hinge means to hold said slice holder in each of said positions.

7. An electric toaster comprising a base, an electric heating element on said base, a guard on one side of said heating element, a slice holder on said one side arranged in a toasting position to hold a slice between the holder and the guard, hinge means pivotally securing said holder to said base having hinge arms pivotally connected adjacent their ends with said base and holder respectively, the ends of said arms adjacent said holder being tapered beyond the pivotal connection with said holder to provide for shifting movement of the holder away from said guard to a second toasting position to thereby define a toasting space of greater depth, said tapered parts arranged to engage said holder to limit the shifting movement of said holder away from said guard and thereby define said second toasting position, and protuberances on said holder in the path of movement of said tapered parts on said arms to define stop means for said arms to hold said slice holder in said two toasting positions.

8. A toaster comprising a support, a vertically arranged heating element on said support, a slice holder on said support arranged generally in a vertical position, hinge means connecting the lower end of said holder to said support having hinge arms at the opposite sides of said holder, hinge pins connecting the lower end portions of said arms to said support and the upper end portions of said arms to said holder, the upper ends of said arms above the pins connecting them to the holder having their edges facing the holder tapering upwardly away from the holder to permit the holder to move on said last named pins from one to another of two relative positions between said arms and said holder, protuberances on said holder engaging said arms to hold the slice holder in each of said positions, and stops on said support arranged to engage said arms to limit pivotal movement of said arms relative to said support in one direction.

HARRY L. STILES.